Aug. 20, 1929.  B. L. McNERNEY  1,725,203

ELECTRIC MOTOR

Filed Nov. 12, 1928

Inventor

Bernard L. McNerney

By Bradbury & Caswell

Attorney

Patented Aug. 20, 1929.

1,725,203

UNITED STATES PATENT OFFICE.

BERNARD L. McNERNEY, OF MINNEAPOLIS, MINNESOTA.

ELECTRIC MOTOR.

Application filed November 12, 1928. Serial No. 318,822.

My invention relates to electric motors and particularly to electric motors having vibrating elements adapted to vibrate between sets of electromagnets, and has for its object to provide a motor adapted to operate by alternating current without the use of commutators and brushes.

Another object of the invention resides in constructing a motor with two sets of electromagnets, and a plurality of vibrating elements alternately attracted thereby, and to further provide a rectifier for use in connection with the alternating current, said rectifier having two feeders, one of said feeders being adapted to energize one set of magnets and the other feeder being adapted to energize the other set of magnets.

Other objects of the invention reside in the novel combination of parts and the details of construction hereinafter illustrated and described:

Figure 2:
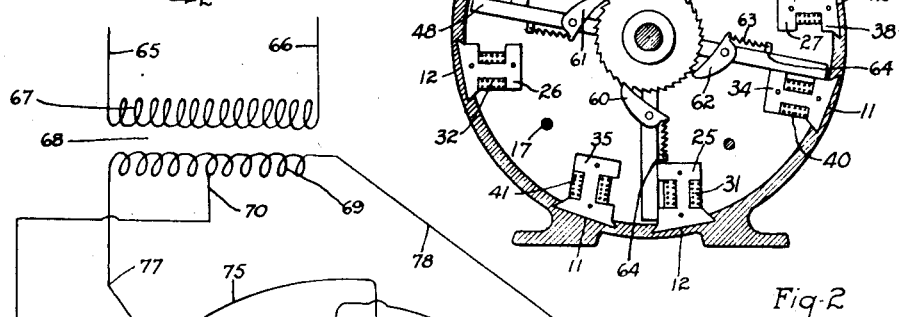
Fig. 2 is a transverse sectional view taken on line 2—2 of Fig. 1.

The electric motor forming a part of my invention comprises a stator A and a rotor B. The stator A includes an annular frame 10 constructed of some suitable material having a relatively low permeability, such as brass or the like. This frame is formed with two series of inwardly facing dove-tailed slots 11 and 12 relatively spaced from one another as best shown in Fig. 2. Along the edge of the frame 10, the same is recessed as indicated at 13 and 14 to receive two end plates 15 and 16 of usual construction, held in place by means of bolts 17. These end plates are formed with bosses 18 and 19 which are fitted with bushings 20 adapted to journal a shaft 21 forming a portion of the rotor B. Suitable oil cups 22 may be provided if desired for lubricating the bearings in the bushings 20.

In conjunction with the frame 10, I employ a number of electromagnets 23, 24, 25, and 26 which comprise laminated cores 27 formed with dove-tailed ends 28 adapted to be received within the dove-tailed slots 12 in the frame 10. These cores have, wound upon them, coils 29, 30, 31 and 32 which are energized in a manner to be presently described. In conjunction with the electromagnets 23, 24, 25 and 26, I employ other electromagnets 33, 34, 35, and 36 which are similarly constructed to the first named electromagnets, being formed with laminated cores 37, having dove-tailed end portions 38 adapted to be received within the dove-tailed slots 11 of frame 10. Upon these magnets are wound coils 39, 40, 41 and 42 which correspond to the similar coils of the first named electromagnets. It will be noted that the magnets of the two groups are paired and formed with facing pole pieces 43—44 and 45—46.

Figure 1:
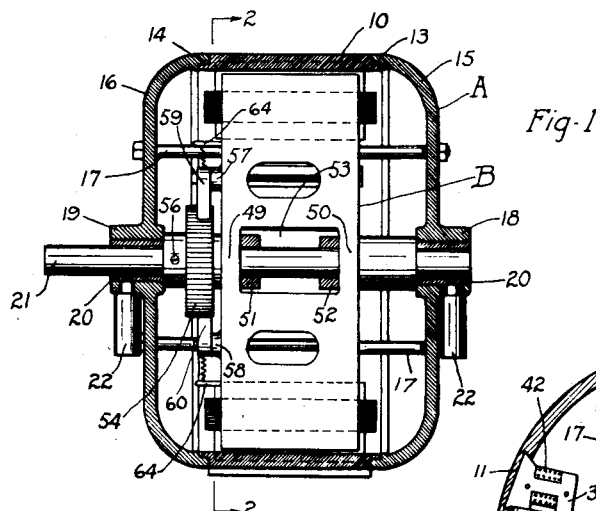
Fig. 1 is a longitudinal sectional view of an electric motor illustrating an embodiment of my invention.

Upon the shaft 21 is mounted for oscillation two plate-like members 47 and 48. The plate-like member 47 is adapted to extend at one end between the pole pieces of magnets 23 and 33, and at its other end between the pole pieces of magnets 24 and 34. This member is formed with bearings 49 and 50 which are journalled upon the shaft 21. The member 48 is similarly constructed to the member 47 and has one side thereof movable between the pole pieces of magnets 26 and 36, and the other side thereon movable between the pole pieces of magnets 24 and 34. This member is provided with bearings 51 and 52, similar to the bearings 49 and 50 which latter bearings are journalled upon the shaft 21 and are disposed within an opening 53 formed in the member 47 as best shown in Fig. 1. With this construction, it can be readily comprehended that the members 47 and 48 may be oscillated back and forth between the pole pieces 43—44 and 45—46 of the electromagnets, depending upon the manner said electromagnets are energized.

For effecting rotational movement of shaft 21 from the oscillatory movement of the members 47 and 48, I mounted upon said shaft a ratchet wheel 54 formed with a number of ratchet teeth 55. This ratchet wheel may be secured to shaft 21 by means of a pin 56 or any other suitable key. The member 47 is formed with two bosses 57 and 58 to which are pivoted two pawls 59 and 60 adapted to engage the teeth 55 of ratchet wheel 54. Similarly, two pawls 61 and 62 are pivoted to the member 48, which in like manner engages the teeth of ratchet wheel 54. All of these pawls are held in contact with the teeth of said ratchet by means of tension coil springs 63 which are attached to said pawls and to pins 64 on said members.

As the members 47 and 48 oscillate, the oscillatory movement thereof causes the shaft 21 to rotate through the ratchet wheel 54 and the various pawls operating in conjunction with said members.

The manner of wiring my improved motor is shown in Fig. 4. For supplying electric current to the motor, which in the instant invention utilizes single phase alternating current, I have shown a line 65—66 which may be connected to any suitable source of alternating current. This line has connected in it the primary 66 of a step-down transformer 68. The secondary 69 of this transformer is tapped at the center as indicated at 70. In conjunction with this transformer, I employ a rectifying tube 71 provided with three elements, 72, 73 and 74. This tube may be of the ordinary type adapted to deliver a pulsating direct current from the respective elements 73 and 74. The various electromagnets of the motor are connected in series in two circuits 75 and 76. The circuit 76 contains the coils 29, 40, 31 and 42 while the circuit 75 contains the coils 39, 30, 41 and 32. The circuit 75 is connected at a point between the coils 39 and 32 by means of a lead 77 to one of the terminals of the secondary 69 of transformers 68, while the circuit 76 is similarly connected at a point between the coils 29 and 40 by means of a lead 28 to the other terminal of the secondary 69 of transformer 68. The circuit 75 is, in addition, connected at a point between the coils 30 and 41 by means of a lead 79 to the element 74 of rectifier 71, while the circuit 76 is similarly connected at a point between the coils 31 and 42 by means of a lead 80 to the element 73 of said rectifier. Another lead 81 between the element 72 of said rectifier and the center tap 70 of transformer secondary 69, completes the wiring of the motor.

Figure 3:
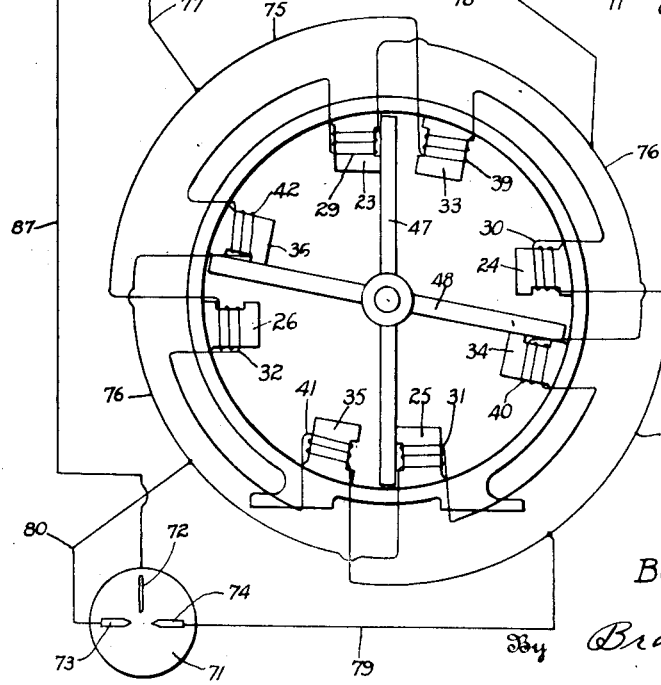
Fig. 3 is a wiring diagram for the invention.

The operation of the motor is as follows: Assume the vibratory member 47 to be in contact with the pole pieces of the magnets 23 and 25 and the member 48 to be in contact with the pole pieces of the magnets 34 and 36 as illustrated in Fig. 3. Upon current flowing through the lead 79 and through the circuit 75, the current divides and passes through the coils 30 and 39 in series, and through the coils 41 and 32 in series, and back to the transformer 68. This causes both of the members 47 and 48 to be attracted by the respective members and oscillate in opposite directions. By means of the pawls 59 and 60, the member 47 causes shaft 21 to receive a partially rotary movement, while the pawls 61 and 62 slip over the ratchet teeth 55 without effecting the rotation of said shaft. Upon the current through the rectifier 71 reversing, current flows through the lead 80 and through the circuit 76 back to the transformer. This causes the other magnets to become energized in a similar manner oscillating both of the members 47 and 48 in opposite direction relative to one another and in directions opposite to those previously described. The member 48 now drives the shaft through the pawls 61 and 62, while the pawls 59 and 60 of member 47 slip over the ratchet teeth 55. As the current from the rectifier alternates from the two terminals, the members 47 and 48 are alternately actuated so that the same vibrate continually in synchronism with the alternation of the impressed electromotive force.

My invention is particularly advantageous in that single phase alternating current may be used to operate the same without the necessity of commutators, brushes or other contacts or circuit breakers. With my invention, a motor of extremely uniform speed may be had, and by varying the number of vibratory elements and corresponding magnets, any rate of speed may be had.

Changes in the specific form of my invention, as herein disclosed, may be made within the scope of what is claimed without departing from the spirit of my invention.

Having described my invention, what I claim as new and desire to protect by Letters Patent is:

Claims:

1. An electric motor comprising a rotatable member and a stationary member, a set of magnets attached to one of said members, a set of vibrating elements movable from and toward said magnets, means actuated by the relative movement of said magnets and elements for rotating said rotatable member, a source of alternating current for energizing said magnets, and means for alternately applying said current to said magnets.

2. An electric motor comprising a rotatable member and a stationary member, a set of magnets attached to one of said members, a set of vibrating elements movable from and toward said magnets, means actuated by the relative movement of said magnets and elements for rotating said rotatable member, a rectifier for alternately delivering current to said magnets.

3. An electric motor comprising a rotatable member and a stationary member, a set of magnets attached to one of said members, a second set of magnets attached to the same member, a set of vibrating elements one for each pair of magnets movable between one magnet of one set and another magnet of the other set, means actuated by the relative movement of said magnets and elements for rotating said rotatable member and means for alternately energizing the respective sets of said magnets to vibrate said vibrating elements.

4. An electric motor comprising a rotatable member and a stationary member, a set of magnets attached to one of said members, a second set of magnets attached to the same member, a set of vibrating elements one for each pair of magnets movable between one magnet of one set and another magnet of the other set, means actuated by the relative movement of said magnets and elements for rotating said rotatable member, a source of alternating current, and means for alternately impressing said current upon said series of magnets to vibrate said vibrating elements.

5. An electric motor comprising a rotatable member and a stationary member, a set of magnets attached to one of said members, a second set of magnets attached to the same member, a set of vibrating elements one for each pair of magnets movable between one magnet of one set and another magnet of the other set, means actuated by the relative movement of said magnets and elements for rotating said rotatable member, a source of alternating current, means for transforming said alternating current into pulsating direct current, and means for impressing said pulsating direct current alternately upon said sets of magnets to vibrate said vibrating elements.

6. An electric motor comprising a rotatable member and a stationary member, a set of magnets attached to one of said members, a second set of magnets attached to the same member, a set of vibrating elements one for each pair of magnets movable between one magnet of one set and another magnet of the other set, means actuated by the relative movement of said magnets and elements for rotating said rotatable member, a source of alternating current, a rectifier associated therewith and having two feeders adapted to deliver distinct pulsating direct currents out of phase with one another and means for connecting said feeders with said sets of magnets to alternately energize the same to vibrate said vibrating elements.

7. In combination, an electric motor comprising a rotatable member and a stationary member, one of said members having two sets of magnets thereon, a plurality of vibrating elements each of said elements being movable between a magnet of one set and a magnet of the other set, means actuated by the vibration of said elements for rotating said rotatable member, a source of alternating current, a transformer connected thereto and having a secondary provided with a center tap, a circuit connecting a number of each of said sets of magnets in series, a second circuit connecting a number of the magnets of the second set in series, a rectifier having a positive and negative element and a common element, the said positive and negative elements being connected to said magnet circuits, a lead connecting said common element to the center tap of said transformer secondary and other leads connecting the terminals of the secondary of said transformer to said magnet circuits.

In testimony whereof I have affixed my signature to this specification.

BERNARD L. McNERNEY.